Figure 1:
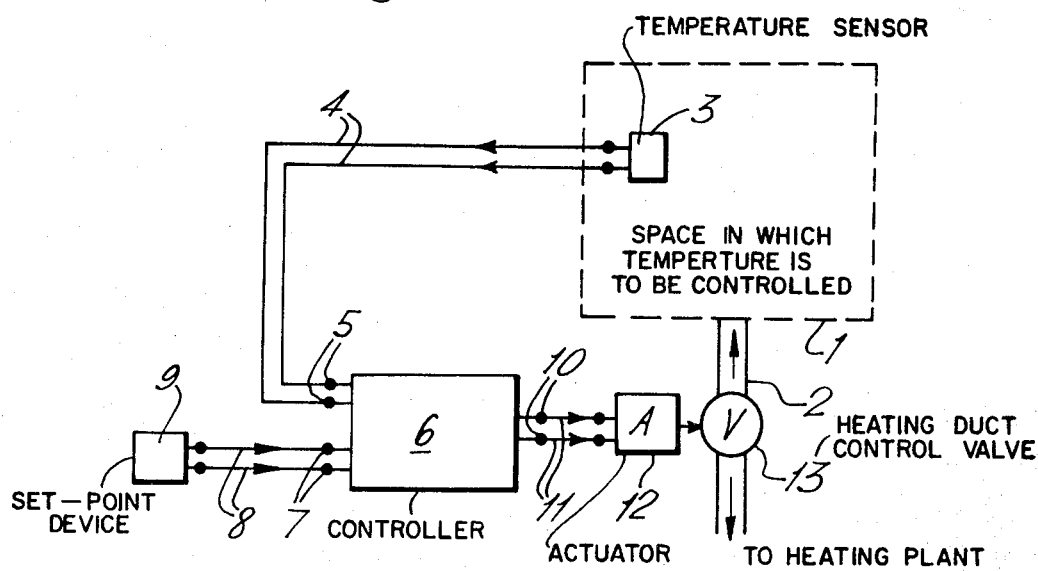
Figure 2:
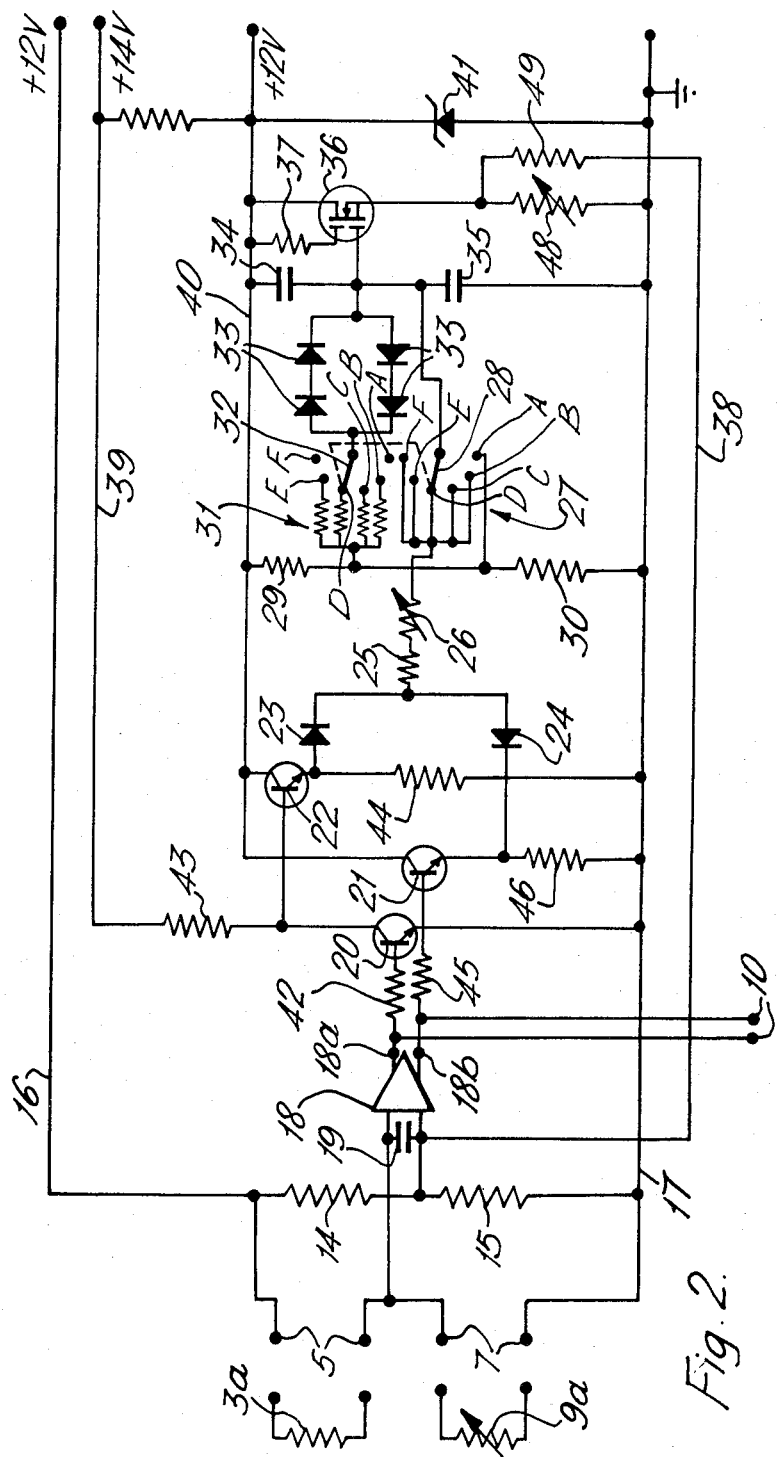
Figure 3:
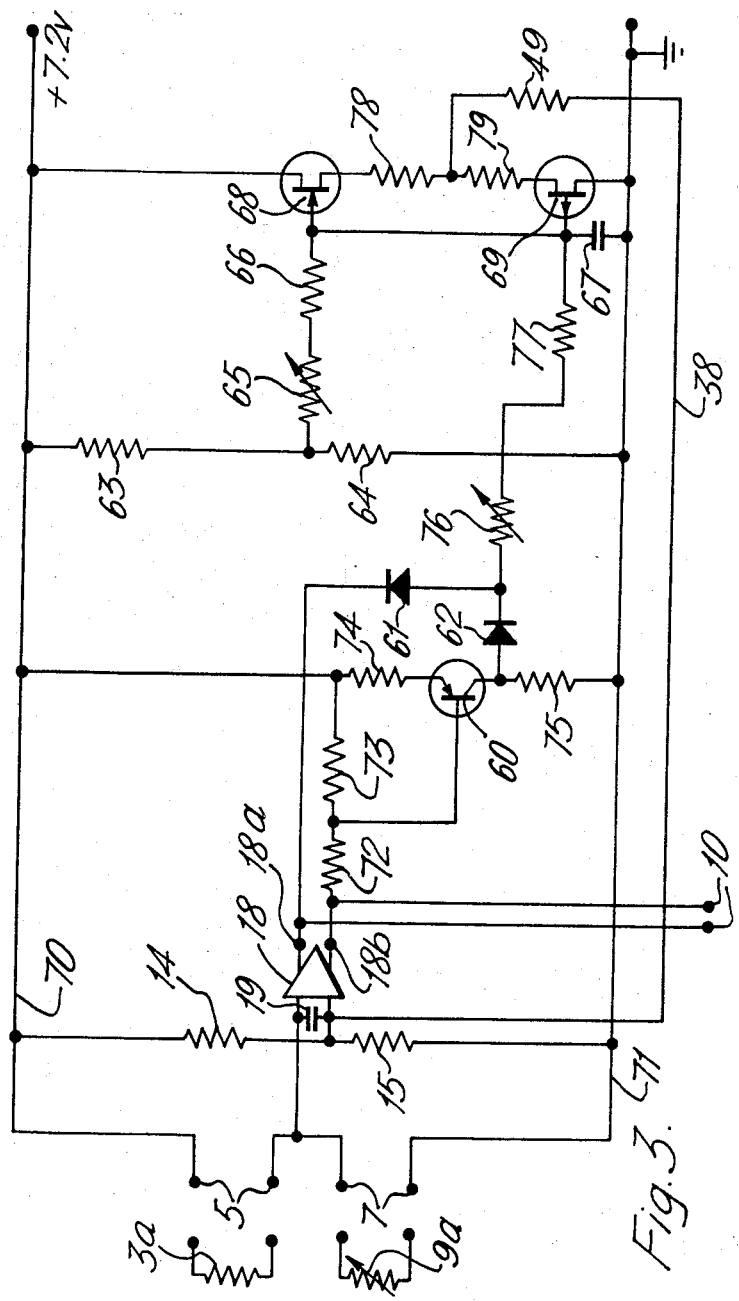

United States Patent
Paul

[15] 3,675,050
[45] July 4, 1972

[54] CONTROL CIRCUITS FOR USE IN AUTOMATIC CONTROL SYSTEMS

[72] Inventor: Ian Andrew Paul, Bishopbriggs, Scotland
[73] Assignee: Honeywell Inc., Minneapolis, Minn.
[22] Filed: Jan. 14, 1971
[21] Appl. No.: 106,521

[30] Foreign Application Priority Data

Jan. 16, 1970 Great Britain..................2,335/70

[52] U.S. Cl..............................307/304, 307/273, 328/209
[51] Int. Cl..............................................H03k 3/26
[58] Field of Search..................307/273, 304, 205, 221, 251, 307/279; 328/192, 209

[56] References Cited

UNITED STATES PATENTS

| | | | |
|---|---|---|---|
| 3,294,983 | 12/1966 | Draper, Jr. | 307/273 |
| 3,497,725 | 2/1970 | Lorditch, Jr. | 307/273 |
| 3,532,993 | 10/1970 | Kennedy | 307/273 |
| 3,571,627 | 3/1971 | Cardon et al. | 307/273 |
| 3,316,902 | 5/1967 | Winchel et al. | 307/273 |
| 3,473,054 | 10/1969 | Wieczorek | 307/251 |
| 3,413,576 | 11/1968 | Sheahan | 307/304 |
| 3,336,503 | 8/1967 | White | 307/304 |
| 3,374,362 | 3/1968 | Miller | 307/251 |
| 3,085,165 | 4/1963 | Schaffert et al. | 307/273 |
| 3,480,801 | 11/1969 | Smith | 307/273 |

Primary Examiner—Donald D. Forrer
Assistant Examiner—R. E. Hart
Attorney—Lamont B. Koontz and Alan M. Staubly

[57] ABSTRACT

A controller for use in a control system is provided having an internal electronic feedback loop to approximate proportional plus integral control. The approximation is achieved through the charging and discharging of a capacitor located in the electronic feedback loop. An actuator is driven during the charging cycles of the capacitor.

14 Claims, 3 Drawing Figures

INVENTOR:
IAN ANDREW PAUL

INVENTOR:
IAN ANDREW PAUL

BY: Alan M. Staubly

ATTORNEY.

CONTROL CIRCUITS FOR USE IN AUTOMATIC CONTROL SYSTEMS

This invention relates to control circuits for use in control systems of the kind which, in the event of a particular variable departing from a set-point value, operate to tend to restore the variable to the set-point value. Such systems are often used for temperature control in buildings, in which case the particular variable is usually the room temperature.

Some of the most serious problems in temperature control in buildings are caused by the inherent time lag which exists between adjustment of a control device, for instance, a hot air or water valve, and detection of the resulting change in temperature. This is usually referred to as the "dead time," and necessitates special precautions in the control system if instability and inaccuracy are not to occur.

For this purpose, control systems are sometimes arranged to produce a form of control which is usually referred to as "Proportional + Integral Control" (P. + I. control). Initially, the state of the control device is varied by an amount substantially proportional to the room or set-point temperature change. This is referred to as the proportional action. Subsequently, integral action occurs. In this, the state of the control device is varied by an amount substantially proportional to the time integral of the room or set-point temperature change. If the control device is a valve, this latter action results in it being varied at a speed proportional to the room or set-point temperature change. This integral action is employed to obtain better accuracy by removing offset.

For example, a control system providing this form of control may include a control circuit having a proportional band (that is a range of room or set-point temperature change which results in proportional movement) of 6° C. Thus, if the room or set-point temperature changes by say 2° C. the actuator moves the control device through one-third of its travel. If the change was 6° C or greater, the control device would be moved to the end of its travel. Other than in the latter case, integral movement takes place after the proportional movement has been completed, as already described, and occurs at a rate dependent on the original change. In any particular control system, this rate is given by the reset time (that is the time taken by the control device when undergoing the integral movement to repeat the travel produced as a result of the proportional movement) and may be the order of an hour.

Thus, in the example given previously, the control device after moving through one-third of its travel as a result of the proportional action, then moves through the next one-third of its travel in one hour and, if it was at the end of its travel initially, through the final one-third of its travel in the next hour.

The pattern of movement just described assumes that while the movement is occurring, the change in the room or set-point temperature is not altered by feedback from the room temperature sensor. In practice, the characteristics of the building, the heating plant, and the control system are matched such that feedback does occur during the integral movement period.

While P. + I. control produces particularly satisfactory results, the control circuits at present available suffer from certain disadvantages. In particular, in order to provide the desired control action, the actuator normally includes a potentiometer providing position feedback. Three conductors are required to connect the potentiometer to the remainder of the control circuit. Particularly if the circuit and the actuator are widely separated, the conductors can add appreciably to the cost of the control system. Moreover, since every movement of the actuator causes adjustment of the potentiometer, the latter is likely to have a relatively short life, as well as requiring regular maintenance if it is not to give trouble in service.

According to the present invention, a control circuit for use in a control system (whether for temperature control or otherwise) has within it a feedback loop including a resistance-capacitance network, the circuit being such that if, when in a balanced state in which the circuit input signal is balanced by the feedback signal, this state of balance is disturbed by a prolonged change in the input signal, the consequential change in the signal applied to the feedback loop, in re-establishing balance, also alters the state of charge of a capacitor in the network by an amount dependent on the change in the input signal, the result being that after balance has been re-established, the charge on the capacitor changes and the feedback signal therefore disturbs the balance, whereupon the control circuit again operates to reestablish balance and also to alter the state of charge of the capacitor, the circuit as a result producing an output signal which has a substantially constant value for a period dependent on the input signal change, after which it alternates between two substantially constant values.

As such, this output signal is not necessarily of the form required to give true P. + I. control action but, however, it has nevertheless been found to produce satisfactory operation. It should be noted that the circuit achieves this without the presence of the previously mentioned potentiometer and connecting conductors, since feedback is produced electrically within the circuit. This is achieved by using the capacitor to effectively determine a period dependent on the input signal change.

The two substantially constant values between which the circuit output signal alternates are conveniently zero and the first mentioned substantially constant value. In other words, the output signal at any instant is either zero or a substantially constant value, the latter being the case initially for a period depending on (preferably substantially proportional to) the input signal change, after which the signal alternates between it and zero. If this signal is used to control the actuator of the control device, it can be seen that the latter is varied at a substantially constant rate for a period dependent on (again preferably substantially proportional to) the input signal change, and thus has its state varied by an amount dependent on (preferably substantially proportional to) the input signal change, and subsequently at a mean rate dependent on the "on period/off period" ratio of the two alternating values.

For true proportional action, the period during which the output signal has the substantially constant value must be proportional to the input signal change. An approximation to such action can be produced by employing only a small proportion of the maximum voltage swing of the capacitor, for instance less than 25 percent, since over such a proportion the exponential voltage/time characteristic of the capacitor can be regarded as being substantially linear.

For true integral action, the mean value of the two substantially constant values (this, of course, depends on their relative periods or, if one is zero, on their on/off ratio) must be proportional to the time integral of the input signal change. It can be seen that the mean value is dependent on the "balance-unbalance" hysteresis of the circuit, since it is this which determines the amount by which the charge on the capacitor must change to disturb and subsequently re-establish balance. Since the hysteresis of a circuit is normally fixed, it might be thought that circuits in accordance with the invention are incapable of producing integral action.

However, this is not necessarily so. Specifically, a form of integral action can be produced if the capacitor is so connected that firstly, after balance has been re-established, its change in charge disturbs balance in a period inversely dependent on the change in the input signal, and secondly, after balance has been disturbed, its change in charge re-establishes balance in a period dependent on the change in the input signal, the result being that the mean value of the output signal when alternating between the two constant values is greater for a greater change in the input signal. If these two constant values are zero and a constant value respectively, as previously mentioned, such integral action is produced by a reduction in the zero or "off" time and an increase in the "on" time for a greater change in the input signal.

The action just described is best explained by an example. For this purpose, assume that the capacitor is charged, rather than discharged, during the proportional action. Thus, the magnitude of the input signal change determines the point on the exponential voltage/time characteristic to which the capacitor is charged. Subsequently, the capacitor charge decreases in an exponential manner until its voltage is sufficiently low to unbalance the circuit, whereupon it charges up again to the original or balance point. Therefore, during the integral action, the capacitor may be regarded as alternately charging and discharging along respective exponential characteristics which meet "voltage-wise" at the point of initial charge. Now the form of these exponential characteristics depends on the point about which these charge changes occur, that is, the point to which the capacitor was first charged. For instance, if the capacitor is already at a high voltage it will take longer to charge and less time to discharge than it would if it was at a lower voltage, and in consequence, the "off" time will be less and the "on" time will be greater. It is this effect which results in the mean value of the output signal being greater for a greater change in the input signal, that is the integral action.

Production of integral action in the manner just described relies, of course, on the non-linearity of the capacitor characteristic. However, as previously stated, for true proportional action a non-linear characteristic is undesirable. These apparently conflicting requirements can, however, be resolved by the provision in the resistance-capacitance network of a resistance element having an applied-voltage-dependent resistance characteristic, the element being connected such that, after balance has been re-established, and in consequence of its characteristic, it causes the state of charge of the capacitor to change in a manner which results in the balance being disturbed in a period inversely dependent on the change in the input signal, the result being that the mean value of the output signal when alternating between the two constant values is greater for a greater change in the input signal. Such an element, therefore, serves to exaggerate the effect produced by the non-linearity of the capacitor and results in a circuit which provides a more than adequate approximation to P. + I. control.

The resistance element may be one or more semi-conductor diodes. Two such diodes, series-connected, are found to give a particularly good non-linear characteristic. Whether diodes or other resistance elements are used, the resistance-capacitance network preferably contains a second resistance element identical to but connected in the opposite electrical direction to the other element, the second element serving to produce the same effect in the event of the input signal being subjected to a prolonged change in the opposite electrical sense to the said prolonged change.

As already indicated, the reset time may be of the order of an hour. This period is dependent on the rate at which the state of charge of the capacitor varies. Accordingly, capacitor leakage currents must be kept to a minimum since they affect the reset time. In this respect, the resistance-capacitance network preferably contains a second equal value capacitor connected in series with the said capacitor across two constant voltage supply lines and having a junction with the said capacitor connected to the resistance or resistances in the network. Use of two capacitors connected in this manner has several advantages. Specifically their junction, from which, as will become apparent, the feedback signal may be obtained, is unaffected by equal leakage. Moreover, use of two capacitors enables them each to have a lower value than if one was employed. Another advantage consequent on this is that lower value resistors can be used in the capacitor charge and discharge path or paths. Lastly but not least, use of two capacitors facilitates provision of integral action in response to *both* polarities of input signal.

It is, of course, important that the rate of change of the charge on the capacitor or capacitors should not be adversely affected by loading produced by the path taken by the feedback signal. In this respect, the feedback loop preferably contains a field effect transistor (which has a high input impedance) having a control gate controlled by the capacitor potential and arranged to provide the feedback signal.

As previously indicated, control circuits in accordance with the invention may be used in other applications besides temperature control. Thus in general, if incorporated (in any of its forms just described) in a control system which, in the event of a particular variable departing from a setpoint value, operates to tend to restore the variable to the set-point value, the system usually comprises set-point means for producing a signal representative of the set-point value, a sensor for producing a signal representative of the actual value of the variable, a comparator for producing an error signal representative of any difference between the two signals, a control device having an actuator by means of which, in order to vary the actual value of the variable, the state of the control device can be varied over a range, and for controlling the actuator in dependence on the error signal, the control circuit. As previously indicated, a prolonged change in the input signal, that is, in the error signal, results in the control circuit causing the actuator to vary the state of the control device at a substantially constant rate for a period dependent on the change in the input signal, and subsequently at a mean rate which is preferably dependent on the change in the error signal.

By way of two examples, control systems and control circuits in accordance with the invention will now be described in more detail with reference to the accompanying drawings in which:

FIG. I is a schematic diagram of one such system;

FIG. II is an electrical circuit diagram of the sensor, set-point means, comparator and control circuit (the latter two units constituting the controller) employed in the system shown in FIG. I; and FIG. III is an electrical circuit diagram showing another controller (together with the sensor and set-point means) that may be employed instead of that shown in FIG. II.

Reference should be made first to FIG. I in which the system is shown controlling the temperature of a space 1 to which warmed air is conveyed by a duct 2 from a heating plant (not shown). The temperature of the space 1 is sensed by a temperature sensor 3 incorporating a temperature-sensitive resistance element. This element develops a voltage signal proportional to the space temperature, the signal being conveyed along conductors 4 to a pair of input terminals 5 of the controller 6. The latter has a further pair of input terminals 7 to which a temperature set-point voltage signal is applied along conductors 8 from a temperature set-point device 9 incorporating an adjustable resistor. The controller 6 operates on the sensed temperature and set-point signals applied to the terminals 5 and 7 respectively, and produces an output voltage signal across a pair of terminals 10. This signal is applied by conductors 11 to an electromechanical actuator 12 of a valve 13 which controls the passage of the warmed air along the duct 2. The actuator 12 includes an essentially constant speed electric motor and a triac-controlled energizing circuit (neither shown) and requires approximately 1 minute to drive the valve 13 from the fully open to the fully closed position or vice-versa.

Reference should now be made to FIG. II which illustrates the electrical circuits of the temperature sensor, the temperature set-point device and the comparator, as well as the control circuit itself.

The temperature sensor, designated 3 in FIG. I, is represented here by a resistor 3a and, as shown, is intended to be connected across one pair 5 of the input terminals of the controller. In a similar manner, the temperature set-point device, designated 9 in FIG. I, is represented here by an adjustable resistor 9a and, as shown, is intended to be connected across the other pair 7 of the input terminals of the controller.

The comparator, which serves to compare the temperature-dependent voltage signal developed across the resistor 3a and the set-point-dependent voltage signal developed across the resistor 9a, includes two equal value resistors 14 and 15 for connection with the resistors 3a and 9a into a bridge network. As can be seen, the bridge network is connected between a +12 volts rail 16 and an earthed rail 17. Any difference between the voltages developed across the resistor 3a (the temperature-dependent signal) and the resistor 9a (the set-point-dependent signal) produces a proportional voltage (the error signal) across the mid-points of the bridge network.

The control circuit includes an integrated circuit amplifier 18, which may comprise several individual amplifiers of the type available commercially under the number 741, having a fixed gain. A capacitor 19 is connected across its input terminals. The power supply connections to the amplifier are not shown, but it is to be understood that they are such that if zero voltage is applied across the two amplifier input terminals, equal positive potentials appear on the two amplifier output terminals 18a and 18b, and, if a voltage exceeding a small fixed value (the amplifier threshold voltage or hysteresis) is applied across the input terminals, the potential on one of the output terminals 18a and 18b falls, depending on whether the differential input voltage is positive or negative. The amount by which the potential falls is substantially independent of the amount by which the input voltage exceeds the threshold voltage. Thus, the amplifier has three distinct outputs and operates rather as a switching circuit than an amplifier. The output terminals 18a and 18b are connected directly to the control circuit output terminals 10 which, as already described, are connected to the valve actuator 12. Depending on which output terminal develops the falling potential, one of two triacs in the energizing circuit is energized and causes the actuator to move the valve 13 in the corresponding direction, which is, of course, arranged to be that which results in the space temperature approaching the set-point temperature.

The previously discussed feedback loop provides feedback from the output to the input of the amplifier 18. Before describing the manner of operation of the feedback loop, it is helpful to note that it includes (a) three transistors 20–22 and two semi-conductor diodes 23 and 24, which together act as a steering network, (b) a resistor 25, an adjustable resistor 26, and a six-position switching arrangement 27 having a movable contact 28, (c) a resistance-capacitance network including resistors 29 and 30, a six-position resistance switching arrangement 31 having a movable contact 32 ganged with the movable contact 28, four semiconductor diodes 33, and two capacitors 34 and 35, (d) a dual gate field effect transistor (FET) 36 having a D.C. biassing resistor 37, and (e) a feedback line 38. These components are energized from a +14 volts rail 39 and a +12 volts rail 40, the latter voltage of which is stabilized by a zener diode 41.

The four diodes 33 act in pairs as two voltage-dependent resistance elements. Thus, the two upper diodes (as shown) provide a resistance which decreases if an increasing forward-biased voltage is applied across them while the other two act in a similar manner but in the opposite direction electrically. Pairs of diodes are employed solely to give a greater non-linear effect than would be produced by single diodes.

The two switching arrangements 27 and 31 serve for calibrating the circuit and also enable its response to be adjusted to suit different applications, as will become apparent. Calibration is carried out when the two movable contacts 28 and 32 are in the positions designated A. The four positions B-E result in different value resistors, as shown, being connected between the junction of the resistors 29 and 30 and the four diodes 33 and hence permit adjustment of the circuit response. The fifth positions F open-circuit the four diodes 33 and hence permit further adjustment of the circuit response.

Operation of the control circuit shown in FIG. II is as follows. When in the balanced state, that is, when the temperature-dependent and set-point voltage signals are equal, zero voltage is applied across the input terminals of the amplifier 18 and hence, as already described, equal positive potentials are present on the two amplifier output terminals 18a and 18b. Thus the voltage applied to the actuator 12 is zero and it, therefore, does not move.

The potential on the terminal 18a, through a resistor 42, renders the transistor 20 conductive. Accordingly, a relatively low voltage is developed on its collector, which is connected to the +14 volts rail 39 through a resistor 43, and hence the transistor 22 is rendered non-conductive. As is clear, this latter transistor is connected between the 12 volts rail 40 and a resistor 44.

The positive potential on the amplifier output terminal 18b, through a resistor 45, renders the transistor 21 conductive. As is clear, this transistor is connected between the +12 volts rail 40 and a resistor 46.

Accordingly, in the balanced state the transistor 22 is non-conductive and the transistor 21 is conductive. In consequence, both diodes 23 and 24 are reverse-biased. Hence there is no current through the resistor 25, the adjustable resistor 26, and the switching arrangement 28 (which it is assumed has its movable contact in one of the four positions B-E).

Since it is desirable (for reasons which become apparent) that in the balanced state, the junction of the two equal value capacitors 34 and 35 should assume half the potential of the 10 volt rail 40, the resistors 29 and 30 are of equal value. Accordingly, the junction of the two capacitors 34 and 35 is at +6 volts, and this potential is applied to the control gate of the FET 36.

It is important that in the balanced state there should be no feedback from the FET 36 to the input of the amplifier 18. This is ensured by adjustment of an adjustable resistor 48 to make the potential on the source of the FET 36 equal to the potential on the junction of the resistors 14 and 15 in the bridge network.

In the event of a change in temperature in the room whose temperature is controlled by the system, or in the set-point temperature, a proportional error signal is applied to the amplifier 18 and, depending on its sense (and assuming it is greater than the amplifier threshold voltage), it causes the potential on one of the amplifier output terminals 18a and 18b to fall by a fixed amount. Consider it to be the potential on the terminal 18a that falls. This is arranged to be such that the transistor 20, which in the balanced state is conductive, is rendered non-conductive, with the result that the transistor 22 is rendered conductive. The diode 23 is, therefore, forward-biased and hence the state of charge of the two capacitors 34 and 35 changes through the transistor 22, the diode 23, the resistors 25 and 26 and the switching arrangement 27. Hence, the potential at the junction of the capacitors 34 and 35 slowly rises. In consequence, the conductivity of the FET 36 slowly increases, with the result that the potential at its source slowly increases. This potential is fed back to the input of the amplifier 18 by a resistor 49 and the feedback line 38 and eventually balances the amplifier, that is, the initial error signal. Thus, the amplifier reverts to its balanced state, the voltage across the terminals 10 falls to zero, and the diode 23 becomes reverse biased again.

Had the potential on the terminal 18b fallen instead of that on the terminal 18a, the amplifier would have again been re-balanced but, of course, in the opposite sense.

In the re-balanced state, the potential on the junction of the capacitors 34 and 35 and on the gate of the FET 36 is higher than that at the junction of the resistors 29 and 30 by an amount dependent on the magnitude of the original error signal (since the state of charge of the capacitors 34 and 35 was altered such as to balance the error signal). In other words, the voltage applied across the two lower diodes 33 (the other two diodes are reverse biased and hence need not be considered at present) increases with an increase in the original error signal. As previously explained, the resistance of these diodes decreases as the voltage across them is increased.

The result of this is that the two upper diodes 33, together with the resistor in circuit in the switching arrangement 31 and the resistor 30, provide a path which causes the state of the charge of the capacitors 34 and 35 to change at a rate which is greater for a greater original error signal. This effect is additional to that which results from the non-linearity of the capacitor characteristics, as previously explained. The change in the state of charge commences immediately balance is re-established and through the FET 36 varies the feedback signal applied to the input of the amplifier 18 and eventually unbalances the amplifier (when the amplifier input voltage has swung through the threshold value), whereupon the latter again renders the transistor 22 conductive. It should be noted that the FET 36 has a high input impedance and hence does not appreciably load the capacitors 34 and 35.

It is apparent, therefore, that the period which elapses before the transistor 22 is rendered conductive is dependent on the rate at which the charge on the capacitors 34 and 35 varies, and hence this period decreases with an increase in the original error signal. In consequence, the period which elapses between the amplifier becoming rebalanced and the feedback signal upsetting this balance, during which period the amplifier produces no voltage across the output terminals 10, is smaller for a larger error signal. Once balance is upset, the amplifier produces an output signal across the terminals 10, and the charge on the capacitors 34 and 35 is again altered (the time required for this is greater for a greater original error signal, as previously explained) to re-balance the amplifier, as already described. The process repeats in this way as long as the error signal is present.

Accordingly, in the event of a prolonged error signal, a constant voltage is produced across the terminals 10 for a period substantially proportional to the error and, subsequently, what may be referred to as a pulse voltage appears across these terminals, the pulses having a value equal to the constant voltage and a mark/space ratio such that their average value or voltage is proportional to the error signal. Thus, the circuit produces a substantially P. + I. output. Since the motor in the actuator 12 is an essentially constant speed motor, this output produces substantially P. + I. control action in the system as a whole, the valve first being adjusted by an amount proportional to the error signal and subsequently by an amount proportional to the time integral of the error signal.

The circuit is readily adjustable to suit different applications. Thus, the proportional band is adjustable by means of the adjustable resistor 26 and the reset or integral control by means of the switching arrangement 31. These adjustments are substantially independent of one another, that is, adjustment of one has very little if any effect on the other. This is naturally desirable.

Reference should now be made to FIG. III in which the reference numerals used in FIGS. I and II are used to designate corresponding components. Thus, the controller includes a temperature-sensitive resistor 3a, a set-point sensitive resistor 9a, respective pairs of input terminals 5 and 7, resistors 14 and 15 constituting part of a bridge network acting as a comparator, an integrated circuit amplifier 18, a feedback line 38 including a resistor 49, and output terminals 10. The difference between the controllers shown in FIGS. II and III lies in the feedback loop.

In the control circuit shown in FIG. III, the feedback loop includes essentially a transistor 60 and two diodes 61 and 62 which, together, act as a steering network, a resistance-capacitance network including resistors 63–66 and a capacitor 67, an N type field effect transistor 68 and a P type field effect transistor 69 which act as impedance transformers, and the feedback line 38. The circuit is connected between a +7.2 volt rail 70 and an earthed rail 71.

Operation of the control circuit is as follows. When in the balanced state, that is, when the temperature-dependent and set-point voltage signals are equal, zero voltage is applied across the input terminals of the amplifier 18 and hence, as previously described, positive potentials are present on the amplifier output terminals 18a and 18b. The potential on the terminal 18a reverse biases the diode 61. The potential on the terminal 18b, though a resistor 72 and in conjunction with resistors 73, 74, and 75, renders the transistor 60 non-conductive. In consequence, the diode 62 is also reverse-biased. Hence, there is no current through an adjustable resistor 76 or through a resistor 77 which is connected to the junction of one side of the capacitor 67 and the gates of the FET's 68 and 69.

It is desirable that in the balanced state this junction should assume half the potential of the +7.2 volts rail 70. This is achieved by the use of resistors 63 and 64 of equal value and further resistors 78 and 79 of equal value. Accordingly, the junction is at +3.6 volts.

It is again important that in the balanced state there should be no feedback to the input of the amplifier 18. It is clear that this condition is met since the resistors 14 and 15 in the bridge network have equal values and the resistors 78 and 79 have equal values.

As in the circuit shown in FIG. II, in the event of a change in temperature in the room whose temperature is controlled by the system or in the set-point temperature, a proportional error signal is applied to the amplifier 18, and depending on its sense, the potential on one of the amplifier output terminals 18a and b falls by a fixed amount. In consequence, a voltage appears across the output terminals 10 and energizes the valve actuator, thus initiating opening or closure movement of the valve, as previously described with reference to FIG. II.

Consider the potential on the terminal 18a to fall. In consequence, the diode 61 is forward-biased. Accordingly, the charge on the capacitor 67 slowly decreases through the resistors 77 and 76, the diode 61 and the amplifier 18. Hence, the potential at the gates of the FET's 68 and 69 decreases. In consequence, the conductivity of the FET 68 slowly decreases and that of the FET 69 slowly increases, with the result that the potential of the junction of the resistors 78 and 79 slowly falls. This potential is fed back to the input of the amplifier 18 by the resistor 49 and the feedback line 38 and eventually balances the amplifier, that is, the initial error signal. When the amplifier reverts to its balanced state, the voltage across the terminals 10 falls to zero and the diode 61 becomes reverse-biased again.

Had the potential on the terminal 18b fallen instead of that on the terminal 18a, the amplifier would have again been rebalanced but, of course, in the opposite sense.

The time required to re-balance the amplifier depends on the amplitude of the error signal. Accordingly, the output voltage across the terminals 10 is present for a period proportional to either the change in the sensed temperature or the change in the set-point temperature, as the case may be. This is the proportional action which was previously described, and results in the valve opening or closing by a proportional amount.

In the re-balanced state, the potential on the junction of the capacitor 67 and the gates of the FET's 68 and 69 is lower than that at the junction of the resistors 63 and 64 by an amount dependent on the magnitude of the original error signal (since the state of charge of the capacitor 67 was decreased such as to balance the error signal). Accordingly, once balance is re-established, the capacitor 67 begins to charge up through the resistors 63, 65 and 66. This causes the potential on the gates of the FET's 68 and 69 to rise and, as a result, their conductivity changes. The potential at the junction of the resistors 78 and 79, therefore, slowly increases. This potential is fed back to the input of the amplifier and eventually unbalances the amplifier (when the amplifier input voltage has swung through the threshold value). The period which elapses before this occurs to some extent increases with an increased original change in charge on the capacitor 67 and, hence, increases with an increase in the amplifier input signal. However, it should be noted that had the amplifier input signal been of the opposite polarity, the period which elapses before balance occurs would have *decreased* to some extent.

Accordingly, in the event of a prolonged error signal, a constant voltage is produced across the terminals 10 for a period proportional to the error and, subsequently, a pulse voltage appears across the terminals, the pulses having a value equal to the constant voltage and a mark/space ratio such that their average value or voltage increases or decreases slightly, depending on whether the error signal increases in a positive or negative sense. Since the latter effect is usually undesirable, it is preferable to employ only a small proportion of the voltage swing of the capacitor so that the mark/space ratio is substantially constant. Such a circuit, therefore, produces proportional action followed by constant speed or "floating action."

This circuit is also readily adjustable to suit different applications. Thus, the proportional band is adjustable by means of the adjustable resistor 76 and the subsequent action by means of the adjustable resistor 65. These adjustments are substantially independent of one another, that is, adjustment of one has very little if any effect on the other. This is naturally desirable.

The embodiments of the invention in which an exclusive property or right is claimed are defined as follows:

1. A controller having an internal feedback loop for feedback control system application responding to an input signal, said controller comprising:
   hysteretic switching comparator means having an input and an output, said comparator means having a balanced state such that a first output signal is presented on said output for values of an input error signal less than a first threshold value and switching to an unbalanced state providing a second output signal for said input error signal exceeding a second threshold value;
   capacitor means charged from a reference voltage value toward a charging voltage value in response to said comparator means being in said unbalanced state to form a capacitor means first signal voltage, and discharged toward said reference voltage level in response to said comparator means being switched to said balanced state to form a capacitor means second signal voltage;
   coupling circuit means having a first set of electrical components through which said capacitor means is charged from said reference level and having a second set of electrical components through which said capacitor means is discharged toward said reference level said coupling circuit means being connected to said output of said comparator means; and
   feedback means introducing said first and second capacitor signal voltages into said input of said comparator means to combine with said input signal to form said input error signal such that said first capacitor means signal voltage will cause said comparator means to switch to said balanced state from said unbalanced state.

2. The apparatus of claim 1 wherein said first output signal is supplied from circuits operably connected to said comparator means output with said comparator means output isolated from all remaining signals in said comparator means.

3. The apparatus of claim 1 wherein:
   for a first sense of said input signal, said second output signal has a first substantially constant magnitude and said charging voltage value exceeds said reference voltage value; and
   for an alternate second sense of said input signal, said second output signal has a second substantially constant magnitude and said charging voltage value is less than said reference voltage value.

4. The apparatus of claim 1 wherein said feedback means contains a field effect transistor controlled by said capacitor means first and second signal voltages.

5. The apparatus of claim 1 wherein said comparator means includes an electronic hysteretic comparator connected to operate semiconductor circuitry, said electronic comparator having an operational output providing:
   a first operating voltage value, for values of said input error signal less than said first threshold value, operating said semiconductor circuitry to cause said comparator means to be in said balanced state; and
   a second operating voltage value, for values of said input error signal exceeding said second threshold value, operating said semiconductor circuitry to cause said comparator means to be in said unbalanced state.

6. The apparatus of claim 3 wherein said comparator means includes an electronic hysteretic comparator connected to operate semiconductor circuitry, said electronic comparator having first and second operational outputs providing:
   a first operating voltage value on both outputs for values of said input error signal less than said first threshold value and for operating said semiconductor circuitry to cause said comparator means to be in said balanced state;
   a second operating voltage value on said first operational output for values of said input error signal exceeding said second threshold value and for said input signal having said first sense, said second operating voltage value for operating said semiconductor circuitry to cause said comparator means to be in said unbalanced state having said second output signal of said first substantially constant magnitude; and
   said second operating voltage value on said second operational output for values of said input error signal exceeding said second threshold value and for said input signal having said second sense, said second operating voltage value for operating said semiconductor circuitry to cause said comparator means to be in said unbalanced state having said second output signal of said second substantially constant magnitude.

7. The apparatus of claim 3 wherein said feedback means contains a field effect transistor controlled by said first and second capacitor signal voltages.

8. The apparatus of claim 3 wherein said feedback means contains two complementary junction field effect transistors controlled by said first and second capacitor signal voltages.

9. The apparatus of claim 3 wherein said capacitor means includes two capacitors in series with said charging and discharging occurring at a junction of said capacitors.

10. The apparatus of claim 1 wherein said first and second sets of electrical components contain substantially linear electrical components.

11. The apparatus of claim 1 wherein said first set of electrical components contains substantially linear electrical components and said second set of electrical components contains substantially linear electrical components and non-linear electrical components.

12. The apparatus of claim 3 wherein said first and second sets of electrical components contain substantially linear electrical components.

13. The apparatus of claim 3 wherein said first set of electrical components contains substantially linear electrical components and said second set of electrical components contains substantially linear electrical components and non-linear electrical components.

14. The apparatus of claim 2 wherein said non-linear electrical components include semiconductor diodes.

* * * * *